(12) United States Patent
Keam (10) Patent No.: US 8,212,857 B2
(45) Date of Patent: Jul. 3, 2012

(54) ALTERNATING LIGHT SOURCES TO REDUCE SPECULAR REFLECTION

(75) Inventor: Nigel Keam, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1560 days.

(21) Appl. No.: 11/627,861

(22) Filed: Jan. 26, 2007

(65) Prior Publication Data
US 2008/0180530 A1 Jul. 31, 2008

(51) Int. Cl.
*G06F 3/041* (2006.01)

(52) U.S. Cl. .......................... 348/31; 345/173

(58) Field of Classification Search ....................... 348/31
See application file for complete search history.

(56) References Cited

U.S. PATENT DOCUMENTS

| | | |
|---|---|---|
| 4,586,817 A | 5/1986 | Ehemann, Jr. |
| 4,896,029 A | 1/1990 | Chandler |
| 4,972,093 A | 11/1990 | Cochran |
| 4,992,650 A | 2/1991 | Somerville |
| 5,109,537 A | 4/1992 | Toki |
| 5,153,418 A | 10/1992 | Batterman |
| 5,291,564 A | 3/1994 | Shah |
| 5,319,214 A | 6/1994 | Gregory |
| 5,436,639 A | 7/1995 | Arai |
| 5,483,261 A | 1/1996 | Yasutake |
| 5,515,452 A | 5/1996 | Penkethman |
| 5,526,177 A | 6/1996 | Fantone |
| 5,528,263 A | 6/1996 | Platzker |
| 5,541,419 A * | 7/1996 | Arackellian ............ 250/566 |
| 5,684,530 A | 11/1997 | White |
| 5,821,930 A | 10/1998 | Hansen |
| 5,831,601 A | 11/1998 | Vogeley |
| 5,835,692 A | 11/1998 | Cragun |
| 5,900,863 A | 5/1999 | Numazaki |
| 5,920,688 A | 7/1999 | Cooper |
| 5,940,076 A | 8/1999 | Sommers |
| 5,973,315 A | 10/1999 | Saldana |
| 5,973,689 A | 10/1999 | Gallery |
| 6,061,091 A | 5/2000 | Van de Poel |
| 6,067,369 A | 5/2000 | Kamei |
| 6,088,019 A | 7/2000 | Rosenberg |
| 6,088,612 A | 7/2000 | Blair |

(Continued)

FOREIGN PATENT DOCUMENTS
EP 0690407 1/1996

(Continued)

OTHER PUBLICATIONS

U.S. Appl. No. 11/620,591; "Specular Reflection Reduction Using Multiple Cameras", David R. Jenkins, 23 pages.

(Continued)

*Primary Examiner* — David Eng
(74) *Attorney, Agent, or Firm* — Workman Nydegger (57) ABSTRACT

An interactive display in which alternating illuminators are used to reduce or cancel specular reflections. The interactive display includes multiple illuminators and at least one camera placed behind one or more display layers. The interactive display uses a phase management mechanism that controls alternation of phases of the interactive display. When in the first phase, the first illuminator is controlled to dominate over the second illuminator. When in the second phase, the second illuminator is controlled to dominate over the first illuminator. A consolidated image is then formulated using a combination of the first and second images. The consolidated image has reduced or eliminated specular reflections as compared to the first and second images alone.

18 Claims, 6 Drawing Sheets

U.S. PATENT DOCUMENTS

| | | | |
|---|---|---|---|
| 6,094,509 A | 7/2000 | Zheng | |
| 6,111,565 A | 8/2000 | Chery | |
| 6,128,003 A | 10/2000 | Smith | |
| 6,154,214 A | 11/2000 | Uyehara | |
| 6,181,343 B1 | 1/2001 | Lyons | |
| 6,225,620 B1 * | 5/2001 | Campbell et al. | 250/221 |
| 6,243,492 B1 | 6/2001 | Kamei | |
| 6,266,061 B1 | 7/2001 | Doi | |
| 6,269,172 B1 | 7/2001 | Rehg | |
| 6,323,503 B1 | 11/2001 | Hecht | |
| 6,339,748 B1 | 1/2002 | Hiramatsu | |
| 6,340,119 B2 | 1/2002 | He | |
| 6,400,836 B2 | 6/2002 | Senior | |
| 6,414,672 B2 | 7/2002 | Rekimoto et al. | |
| 6,448,987 B1 | 9/2002 | Easty | |
| 6,469,722 B1 | 10/2002 | Kinoe | |
| 6,476,378 B2 | 11/2002 | Nougaret | |
| 6,478,432 B1 | 11/2002 | Dyner | |
| 6,520,648 B2 | 2/2003 | Stark | |
| 6,522,395 B1 | 2/2003 | Barnji | |
| 6,529,183 B1 | 3/2003 | MacLean | |
| 6,545,663 B1 | 4/2003 | Arbter | |
| 6,600,475 B2 | 7/2003 | Gutta | |
| 6,604,682 B2 | 8/2003 | Wakamiya | |
| 6,614,422 B1 | 9/2003 | Rafii | |
| 6,633,338 B1 | 10/2003 | Pelsue et al. | |
| 6,636,621 B2 | 10/2003 | Thebaud | |
| 6,639,594 B2 | 10/2003 | Zhang | |
| 6,654,007 B2 | 11/2003 | Ito | |
| 6,663,244 B1 | 12/2003 | Wichner | |
| 6,690,363 B2 | 2/2004 | Newton | |
| 6,710,770 B2 | 3/2004 | Tomasi | |
| 6,714,221 B1 | 3/2004 | Christie | |
| 6,720,949 B1 | 4/2004 | Pryor | |
| 6,750,877 B2 | 6/2004 | Rosenberg | |
| 6,781,069 B2 | 8/2004 | Silverstein | |
| 6,788,411 B1 | 9/2004 | Lebens | |
| 6,788,813 B2 | 9/2004 | Cooper | |
| 6,791,530 B2 | 9/2004 | Vernier | |
| 6,804,396 B2 | 10/2004 | Higaki | |
| 6,812,907 B1 | 11/2004 | Gennetten | |
| 6,840,627 B2 | 1/2005 | Olbridch | |
| 6,888,960 B2 | 5/2005 | Penev | |
| 6,895,104 B2 | 5/2005 | Wendt | |
| 6,956,963 B2 | 10/2005 | Ulrich | |
| 6,959,102 B2 | 10/2005 | Peck | |
| 6,975,360 B2 | 12/2005 | Slatter | |
| 7,006,128 B2 | 2/2006 | Xie | |
| 7,007,236 B2 | 2/2006 | Dempski | |
| 7,058,217 B2 | 6/2006 | Thomber | |
| 7,075,687 B2 | 7/2006 | Lippert | |
| 7,079,238 B2 * | 7/2006 | Vaez-Iravani et al. | 356/237.4 |
| 7,084,859 B1 | 8/2006 | Pryor | |
| 7,095,401 B2 | 8/2006 | Liu | |
| 7,119,897 B2 * | 10/2006 | Vaez-Iravani et al. | 356/237.4 |
| 7,120,280 B2 | 10/2006 | Biswas | |
| 7,136,537 B2 | 11/2006 | Pilu et al. | |
| 7,144,117 B2 | 12/2006 | Kojima | |
| 7,161,578 B1 | 1/2007 | Schneider | |
| 7,168,813 B2 | 1/2007 | Wong | |
| 7,204,428 B2 | 4/2007 | Wilson | |
| 7,268,774 B2 | 9/2007 | Pittel | |
| 7,281,661 B2 * | 10/2007 | Zhu et al. | 235/462.22 |
| 7,310,085 B2 | 12/2007 | Holloway | |
| 7,327,376 B2 | 2/2008 | Shen | |
| 7,342,574 B1 | 3/2008 | Fujioka | |
| 7,372,977 B2 | 5/2008 | Fujimura | |
| 7,375,810 B2 * | 5/2008 | Nikoonahad et al. | 356/401 |
| 7,379,562 B2 | 5/2008 | Wilson | |
| 7,391,507 B2 * | 6/2008 | Chism, II | 356/32 |
| 7,394,459 B2 | 7/2008 | Bathiche | |
| 7,397,464 B1 | 7/2008 | Robbins | |
| 7,398,927 B2 * | 7/2008 | Olmstead et al. | 235/454 |
| 7,404,146 B2 | 7/2008 | Bennetts | |
| 7,418,671 B2 | 8/2008 | Hama | |
| 7,467,380 B2 | 12/2008 | Kurlander | |
| 7,492,357 B2 | 2/2009 | Morrison | |
| 7,499,027 B2 | 3/2009 | Brigham | |
| 7,515,143 B2 | 4/2009 | Keam | |
| 7,519,223 B2 | 4/2009 | Dehlin | |
| 7,525,538 B2 | 4/2009 | Bathiche | |
| 7,576,725 B2 | 8/2009 | Bathiche | |
| 7,613,358 B2 | 11/2009 | Wilson | |
| 7,630,002 B2 * | 12/2009 | Jenkins | 348/218.1 |
| 7,665,041 B2 | 2/2010 | Wilson et al. | |
| 7,701,437 B2 * | 4/2010 | Thursfield | 345/156 |
| 7,724,242 B2 * | 5/2010 | Hillis et al. | 345/173 |
| 7,728,821 B2 * | 6/2010 | Hillis et al. | 345/173 |
| 7,787,706 B2 | 8/2010 | Yee | |
| 7,907,128 B2 | 3/2011 | Bathiche | |
| 7,911,444 B2 | 3/2011 | Yee | |
| 8,060,840 B2 | 11/2011 | Billow | |
| 2001/0012001 A1 | 8/2001 | Rekimoto | |
| 2001/0036299 A1 | 11/2001 | Senior | |
| 2001/0055006 A1 | 12/2001 | Sano | |
| 2002/0006786 A1 | 1/2002 | Mine | |
| 2002/0041700 A1 | 4/2002 | Thebaud | |
| 2002/0113882 A1 | 8/2002 | Pollard | |
| 2002/0125411 A1 | 9/2002 | Christy | |
| 2002/0181774 A1 | 12/2002 | Ishikura | |
| 2002/0186221 A1 | 12/2002 | Bell | |
| 2003/0156756 A1 | 8/2003 | Gokturk | |
| 2003/0161524 A1 | 8/2003 | King | |
| 2004/0001113 A1 | 1/2004 | Zipperer | |
| 2004/0005920 A1 | 1/2004 | Soltys | |
| 2004/0090524 A1 | 5/2004 | Belliveau | |
| 2004/0155902 A1 | 8/2004 | Dempski | |
| 2004/0196371 A1 | 10/2004 | Kono | |
| 2005/0050476 A1 | 3/2005 | SanGiovanni | |
| 2005/0064936 A1 | 3/2005 | Pryor | |
| 2005/0110964 A1 | 5/2005 | Bell | |
| 2005/0122306 A1 | 6/2005 | Wilcox | |
| 2005/0122308 A1 | 6/2005 | Bell | |
| 2005/0134853 A1 | 6/2005 | Ingleson et al. | |
| 2005/0151850 A1 | 7/2005 | Ahn | |
| 2005/0162381 A1 | 7/2005 | Bell | |
| 2005/0212753 A1 | 9/2005 | Marvit | |
| 2005/0226467 A1 | 10/2005 | Hatano | |
| 2005/0227217 A1 | 10/2005 | Wilson | |
| 2005/0238201 A1 | 10/2005 | Shamaie | |
| 2005/0245302 A1 | 11/2005 | Bathiche | |
| 2005/0255434 A1 | 11/2005 | Lok | |
| 2006/0033835 A1 | 2/2006 | Pollard et al. | |
| 2006/0034492 A1 | 2/2006 | Siegel | |
| 2006/0036944 A1 | 2/2006 | Wilson | |
| 2006/0043194 A1 | 3/2006 | Barkan et al. | |
| 2006/0056662 A1 | 3/2006 | Thieme | |
| 2006/0092267 A1 | 5/2006 | Dempski | |
| 2006/0152741 A1 | 7/2006 | Quist | |
| 2006/0163355 A1 | 7/2006 | Olmstead et al. | |
| 2006/0178212 A1 | 8/2006 | Penzias | |
| 2006/0202974 A1 | 9/2006 | Thielman | |
| 2007/0063981 A1 | 3/2007 | Galyean | |
| 2007/0075163 A1 | 4/2007 | Smith et al. | |
| 2007/0126717 A1 | 6/2007 | Cohen | |
| 2007/0279494 A1 | 12/2007 | Aman | |
| 2008/0036732 A1 | 2/2008 | Wilson et al. | |
| 2008/0122786 A1 | 5/2008 | Pryor | |
| 2009/0121894 A1 | 5/2009 | Wilson et al. | |
| 2009/0262070 A1 | 10/2009 | Wilson | |
| 2011/0181551 A1 | 7/2011 | Yee | |
| 2012/0023423 A1 | 1/2012 | Bilow | |

FOREIGN PATENT DOCUMENTS

| | | |
|---|---|---|
| EP | 1233606 | 2/2002 |
| FR | 2756077 | 5/1998 |
| JP | 2004-259247 | 9/2004 |
| JP | 2004-319364 | 11/2004 |
| JP | 2006-031941 | 2/2006 |
| JP | 2007-514242 | 5/2007 |
| KR | 102001005203 | 1/2001 |
| KR | 1020040072652 | 8/2004 |
| KR | 1020050051554 | 6/2005 |
| WO | WO 91/18383 | 11/1991 |
| WO | WO 97-14075 | 4/1997 |

| | | |
|---|---|---|
| WO | WO 98/19292 | 5/1998 |
| WO | WO 01/84251 | 11/2001 |
| WO | WO 2005-057399 | 6/2005 |

OTHER PUBLICATIONS

U.S. Appl. No. 10/870,777; "Method and System for Reducing Effects of Undesired Signals in an Infrared Imaging System", Andrew D. Wilson, 39 pages.

Dense Estimation of Surface Reflectance Properties of Objects with Interreflections, Dec. 10, 2002, 4 pages.

Feris, Rogerio et al., "Specular Reflection Reduction with Multi-Flash Imaging", published 2004, 6 pages.

"3.6 Interpolation in Two or More Dimensions," Numerical Recipes in C: The Art of Scientific Computing. Chapter 3. Interpolation and Extrapolation. © 1988-1992, Cambridge University Press. Numberical Recipes Software. pp. 123-128.

"Bar Code 1, 2-Dimensional Bar Code Page." Available http://www.adams1.com/pub/russadam/stack.html. Printed Jan. 20, 2004. 14pp.

Ambiente article. "InteracTable®." Dated Jul. 7, 2000. Available http://wwww.darmstadt.gmd.de/ambiente/activities/interactable.html. Printed Nov. 21, 2003 3pp.

Bier, Stone, Pier, Buston, and DeRose. "Toolglass and Magic Lenses: The See-Through Interface." *Proceedings of Siggraph '93* (Anaheim, August). *Computer Graphics Annual Conference Series*, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 47-47.

"DiamondSpin—Begs for Direct Manipulation Technology Is it in the Pen? Sony Leaps Out-of-the-Box Again Pen with Gummi." Mitsubishi/DiamondSpin. CHI 2004#3. Printed Apr. 30, 2004. 5pp.

Electronic Check Alliance Processing, Inc. "Gift Cards, How Stored Value Card Systems Work." Available. http:www.electron-cap.com/GiftCards.htm. Printed Jan. 20, 2004 and May 16, 2004. © 2003. 2pp. Total (3pp printed).

Fukuchi and Rekimoto. Interaction Tehcniques for SmartSkin.: *ACM UIST2002 demonstration*, 2002. 2pp.

Grabowski, Robert. "A Miniature Vidwo Laser Range Finder for Small Robots." Available http://www.andrew.cmu.edu/~rig/research_hardware/laser_rangefinder.html. Printed May 16, 2004. 8pp.

Grant and Winograd. "Flexible, Collaborative Organization on a Tabletop." ACM CSCW 2002: Workshop on Co-located Tabletop Collaboration: Technologies and Directios. New Orleans, LA. Nov. 2002. pp. 1-4.

Horn, Berthold K.P. "Robot Vision." The MIT Press. Available http://mitpress.mit.edu/catalog/item/default.asp?ttype=2&tid=8388. Printed Dec. 17, 2003. 6pp. Total.

Horn, Berthold Klaus Paul. "Robot Vision." Binary Images: Topological Properties. The MIT Electrical Engineering and Computer Science Seriese. 1986. pp. 66-71 an cover pages(s).

Hunter, Anderw. "Connected Components Analysis (Computer Vision)." ww.google.com search results http://www.google.com/search?sourceid=navclient&q=connected+component+ellipse. Printed Mar. 7, 2004. Article dated Sep. 24, 2002. 2pp search results, 21pp article.

IR Distance Sensor.: Available http://www.diyelectronics.com/Accessories/IRDS.html (2pp) and http://www.diyelectronics.com/Accessories/GP2D05.html (lpg.). Printed Dec. 30, 2003. 3pp.

"Tangible Bits: Towards Seamless Interfaces between People, Bits and Atoms." *Proceedings of CHI '97*, Mar. 22-27, 1997, Atlanta, Georgia © 1997 ACM 0-89791-802-9/97/03. pp. 1-8.

Ishii, Wisneski, Orbanes, Chun, and Paradiso. "PinPongPlus: Design of an Athletic-Tangible Interface for Computer-Supported Cooperative Play." *Proceedings of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001 pp. 269-270.

Kang, Sing Bing. "Radial Distortion Snakes." *IAPR Workshop on Machine Vision Applications* (MVA2000), Tokyo, Japan. Nov. 2000. pp. 603-606.

Kato Billinghurst, Poupyrev, Imamoto, and Tachibana. "Virtual Object Manipulation on a Table-Top AR Environment." *IEEE and ACM Int'l Symposium on Augmented Reality* 2000, ISAR '2000, Oct. 5-6, 2000, Munich 9pp.

Klemmer, Newman, and Sapien. "The Designer's Outpost: A Task-Centered Tangible Interface for Web Site Information Design." *Proceedings of Human Factors in Computing Systems: Chi 2000 Extended Abstracts*. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001*. 3(2). pp. 1-10.

Kobayashi, Hirano, Narita, and Ishi. "A Tangible Interface for IP Network Simulation." *CHI 2003*, Apr. 5-10, 2003, F. Lauderdale, FL ACM 1-58113-630-7/03/0004. 2pp.

Koike, Sato, and Kobayashi. "Integrating Paper and Digital Information on EnhanceDesk: A Method for Reltime Finger Tracking on an Augmented Desk System." ACM Transaction on Computer-Human Interaction, vol. 8 No. 4, Dec. 2001. ©2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction in Semi-Immersive Virtual Environments." Proceedings of the IEEE Virtual Relaity 2000 Conference, Mar. 18-22, 2000. New Brunswick, New Jersey: IEEE Computer Society, 2000. 8pp.

Leigh and Dietz "DiamondTouch Characteristics and Capabilities." Mitsubishi Electric Research Laboratories, Cambridge, Massachusetts, USA. Undated. 2pp.

Magerkurth, Stenzel, and Prante. "STARS—A Ubiquitous Computing Platform fo rComputer Augmented Tabletop Games." 5th International Conference on Ubiquitous Computing (Ubicomp '03), Oct. 12-15, 2003, Seattle, Washington. 2 pp.

Malandain, Gregoire. "Connected Components Extraction." Available http://www-sop.inria.fr/epidaure/personnel/malandai/segment/connese.html. Printed Dec. 18, 2003. 3pp.

Matsushita and Rekimoto. "HoloWall; Designing a Finger, Hand, Body, and Object Sensitive Wall." UIST '97 Banff, Alberta, Canada. © 1997 ACM 0-89791-881-9/97/10. pp. 209-210.

Missouri Department of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." UIST '99. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." Proceedings of UISY 2002, Oct. 27-30, 2002. © 2002 ACM. 10pp.

Paradiso, Hsiao, Strickon, Lifton, and Adler. "Sensor systems for interactive surfaces." IBM Systems Journal, vol. 39, Nos. 3&4, 2000. pp. 892-914.

Patten, Ishii, Hines, and Pangaro. "Sensetable: A Wireless Object Tracking Platform for Tangible User Interfaces." Proceedings of CHI 2001, Mar. 31-Apr. 5, 2001, ACM Press, © 2001 ACM. 8 pp.

Patten, Recht, and Ishii. "Audiopad: A Tag-based Interface for Musical Performance." Proceedings of Conference on New Interface for Musical Expression (NIME '02). Dublin, Ireland, May 24-26, 2002 6pp.

Ramos and Balakrishnan. "Fluid Interaction Techniques for the Control and Annotation of Digital Video." UIST '03 Vancouver, B.C., Canada. © 2003 ACM 1-58133-636-06/03/0010. pp. 105-114.

Rekimoto and Ayatsuka "CyberCode: Designing Augmented Reality Environments with Visual Tags." Proc. of UIST 2000, 2000. 1Opp.

Rekimoto and Matsushita. "Perceptual Surfaces :Towards a Human and Object Sensitive Interactive Display." Proceedings of Workshop on Perceptual User Interactes (PUI'97), 1997. 3pp.

Rekimoto and Nagao. "The World through the Computer: Computer Augmented Interaction with Real World Environments." Proceedings of UIST'95, 1995. pp. 29-36.

Rekimoto and Saitoh. "Augmented Surfaces: A Spatially Coninuous Work Space for Hybrid Computing Environments." CHI '99, May 15-20, 1999. Pittsburgh, Pennsylvania. © ACM 1999 0-201-48559-1/99/05. pp. 378-385.

Rekimoto, Jun. "Matrix: A Realtime Object Identification and Reistration Method for Augmented Reality." Proc. of Asia Pacific Computer Human Interaction (APCHI '98), 1998. 6pp.

Rekimoto, Jun. "Multiple-Computer User Interfaces: 'Beyond the Desktop' Direct Manipulation Environments." ACI CHI2000 Video Proceedings, 2000. 2pp.

Rekimoto, Jun. "Pick-and-Drop: A Direct Manipulation Technique for Multiple Computer Environments." Proceedings of UIST'97, 1997. pp. 31-39.

Rekimoto, Jun. "SmartSkin: An Infarastructure for Freehand Manipulation on Interactive Surfaces." *CHI 2002*, Apr. 20-25, 2002, Minneapolis, Minnesota. © 2001 ACM 1-58113-453-3/02/0004. 8pp.

Rekimoto, Ullmer, and Oba. "Data Tiles: A Modular Platform for Mixed Physical and Graphical Interactions." *SIGCHI'01*, Mar. 31-Apr. 4, 2001, Seattle, WA. ©2001 ACM 1-58113-327-8/01/0003. 8pp.

Reznik, Canny, and Alldrin. "Leaving on a Plane Jet." *2001 Int. Conf. on Intell. Robots & Systems* (*IROS*), Maui, Hawaii, Oct. 2001. 6pp.

Ringel, Gerh, Jin, and Winograd. "Barehands: Implement-Free Interaction with a Wall-Mounted Display." Short Talk. *CHI 2001* Mar. 31-Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews, TablePCHome. com—Table PC user community*. Posted Apr. 10, 2003. Available http://vvvvw.tabletpchome.com/Messages.aspx?ThreadID=140. Printed Dec. 30, 2003. pp. 1-2 of 5.

Schmalstieg, Encarnação, and Szalavári. "Using Transparent Props for Interaction With the Virtual Table." Presented at *1999 ACM Symposium on Interactiave 3D Graphics* (I3DG '99). Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 2Opp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 1Opp.

Shen, Lesh, and Vernier. "Personal Digital Historian: Story Sharing Around the Table." *Interactions*. Mar. +Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © 2002 ACM 1-58113-560-2/02/0011. 10pp.

Shen, Lesh, and Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." CHI 2004, Apr. 24-29, 2004, Vienna, Austria. © 2004 ACM 1-58113-702-8/04/0004. 8pp.

Smart Technologies Inc. White Paper. "DViT Digital Vision Touch Technology." Feb. 2003. 10pp.

Smart Technologies, Inc. "Rear Projection SMART Board ™Interactive Whiteboard" "SMART Board Software". Available http://www.smarttech.com/Products/rearprojection/index.asp an .http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech. Edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation." *Proceedings of the ACM Conference on Human Factors in Computing Systems* (CHI'99), Pittsburgh, Pennsylvania, May 15-20, 1999. ACM Press, New York. pp. 120-127.

Symanzik, Jürgen. "Three-Dimensional Statistical Graphics Based on Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic* (USIT'01), ACM Press (CHI Letters 3(2)),2001, pp. 11-20 (10pp).

Ullmer and Ishii. "The metaDESK: Models and Prototypes for Tangible User Interfaces." Proceedings of UIST'97, Oct. 14-17, 1997. © 1997 ACM—ACM 0-89791-881-9/97/10. 10pp.

Ullmer, Ishii and Glas. "mediaBlocks: Physical Containers, Transports, and Controls for Online Media." *Computer Graphics Proceedings* (SIGGRAPH'98), Jul. 19-24, 1998, © 1998 ACM. ACM-089791-999-8 8/98/007. 8pp.

Ullmer, Ishii and Jacob. "Tangible query Interfaces: Physically Constrained Tokens for Manipulating Database Queries." Proc. *INTERACT 2003 Conference*, 2003. 11 pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." Proceedings of CHI '99. May 15-20, 1999. © 1998 ACM. pp. 1-8.

Underkoffler Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"VIRTUALBOARD." Available http://visilab.unime.it/visilab/virtualboard.htm. Printed Dec. 16, 2003.

Von Hardenberg and Bérard. Bare-Hand Human-Computer Interaction. PUI 2001 Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

Hardenberg Von. Christian, "Fingertracking and Handposture Recognition for Real-Tim Human-Computer Interaction", Berlin, Jul. 20, 2001.

Kijma, Ryugo, et al. "Distributed Display Approach Using PHMD with Infrared Camera", Proceedings of the IEEE Virtual Rality, Orlando, Florida, Mar. 24-28, 2002. pp. 1-8.

Pavlidis, Ioannis, et al. "A Vehicle Occupant Counting System Based on Near-Infrared Phenomenology and Fuzzy Neural Classification", IEEE Transactions on Intelligent Transportation Systtem, New York, NY, vol. 1, No. 2., Jun. 2000, pp. 78-80.

"The Tracking Cube: A Three Dimensional Input Device" IBM Techincal Disclosure Bulletin, IBM Corp. New York, US, vol. 32, No. 3B; Aug. 1, 1989, pp. 91-95.

Northop Grumman "TouchTable™" Brochure © 2005 Northop Grumman Space & Mission Systems Corp. RS1190705. 2pp.

Department of Defense, Department of Defense Logistics Automatic Indentification Technology Handbook for Product and Shipping Label Quality Assurance, Feb. 15, 2000, p. 14, Section 3.3.3.6, http://www.dodait.com/conf/data1199/printquality/print0111r6.doc.

Strickson, Joshua and Paradiso, Joseph; "Tracking Hands Above Large Interactive Surfaces with Low-Cost Scanning Laser Rangefinder" ACM CHI. 98 Conference, Apr. 21-23, 1998, Los Angeles, CA.; pp. 1-2.

Lensch, Hendrick P.A.; Goesele, Michael; Jan Kautz; Hans-Peter Seidel; "A Framework for the Acquisition, processing, Transmission, and Interactive Display of High Quality 3D Models on the Web" Research Report, Max-Planck-Institute, May 2001; Sections 5 and 8.

Dynamic Lighting System for Specular Surface Inspection; R. Seulin, F. Merienne, P. Gorria; Laboratories Le2i, Univ. de Bourgogne, Le Creusot, France, 71200 (11 pages).

Machine Vision System for Specular Surface Inspection: Use of Simulation Process as a Tool for Design and Optimization; E. Seulin, F. Merienne and P. Gorria; (6 pages).

U.S. Appl. No. 10/880,167, Mar. 25, 2008, Office Action.
U.S. Appl. No. 10/880,167, Oct. 8, 2008, Notice of Allowance.
U.S. Appl. No. 10/880,167, Dec. 31, 2008, Notice of Allowance.
U.S. Appl. No. 10/834,675, Jun. 29, 2007, Office Action.
U.S. Appl. No. 10/834,675, Dec. 13, 2007, Office Action.
U.S. Appl. No. 10/834,675, Mar. 28, 2008, Notice of Allowance.
U.S. Appl. No. 10/814,761, Oct. 16, 2007, Notice of Allowance.
U.S. Appl. No. 10/814,761, Feb. 17, 2008, Notice of Allowance.
U.S. Appl. No. 10/870,777, Aug. 30, 2007, Office Action.
U.S. Appl. No. 10/870,777, Feb. 28, 2008, Notice of Allowance.
U.S. Appl. No. 10/870,777, Aug. 29, 2008, Office Action.
U.S. Appl. No. 10/870,777, May 6, 2009, Notice of Allowance.
U.S. Appl. No. 10/867,434, Oct. 9, 2007, Office Action.
U.S. Appl. No. 10/867,434, Jul. 10, 2008, Office Action.
U.S. Appl. No. 10/867,434, Nov. 28, 2008, Office Action.
U.S. Appl. No. 10/867,434, Sep. 17, 2009, Office Action.
U.S. Appl. No. 10/969,746, Apr. 23, 2008, Notice of Allowance.
U.S. Appl. No. 10/969,746, Oct. 17, 2008, Notice of Allowance.
U.S. Appl. No. 10/969,746, Mar. 11, 2009, Notice of Allowance.
U.S. Appl. No. 11/117,979, Jun. 12, 2008, Office Action.
U.S. Appl. No. 11/117,979, Sep. 11, 2008, Notice of Allowance.
U.S. Appl. No. 11/117,979, Nov. 14, 2008, Notice of Allowance.
U.S. Appl. No. 10/813,855, Oct. 9, 2007, Office Action.
U.S. Appl. No. 10/813,855, May 7, 2008, Office Action.
U.S. Appl. No. 10/813,855, Feb. 19, 2009, Office Action.
U.S. Appl. No. 10/813,855, Sep. 24, 2009, Office Action.
U.S. Appl. No. 12/106,910, Oct. 30, 2008, Office Action.
U.S. Appl. No. 12/106,910, Jun. 25, 2009, Notice of Allowance.
U.S. Appl. No. 11/364,319, Jun. 26, 2008, Office Action.
U.S. Appl. No. 11/364,319, Dec. 31, 2008, Notice of Allowance.
U.S. Appl. No. 11/170,234, Sep. 2, 2008, Office Action.
U.S. Appl. No. 11/170,234, Jan. 12, 2009, Notice of Allowance.
U.S. Appl. No. 11/321,551, Feb. 8, 2008, Office Action.
U.S. Appl. No. 11/321,551, Aug. 19, 2008, Office Action.
U.S. Appl. No. 11/321,551, Jan. 26, 2009, Office Action.
U.S. Appl. No. 11/321,551, Aug. 4, 2009, Office Action.
U.S. Appl. No. 11/321,551, Oct. 26, 2009, Office Action.
U.S. Appl. No. 11/218,171, Oct. 7, 2008, Office Action.
U.S. Appl. No. 11/218,171, Apr. 15, 2009, Office Action.
U.S. Appl. No. 11/218,171, Nov. 23, 2009, Office Action.
U.S. Appl. No. 10/867,434, Jan. 4, 2010, Office Action.
U.S. Appl. No. 11/321,551, Mar. 31, 2010, Office Action.
U.S. Appl. No. 10/867,434, Jun. 14, 2010, Notice of Allowance.
U.S. Appl. No. 11/218,171, Jun. 17, 2010, Office Action.
U.S. Appl. No. 10/813,855, Jun. 22, 2010, Office Action.
U.S. Appl. No. 12/110,032, Jul. 8, 2010, Office Action.
U.S. Appl. No. 11/321,551, Jul. 9, 2010, Office Action.
U.S. Appl. No. 12/110,032, Nov. 2, 2010, Notice of Allowance.
U.S. Appl. No. 11/218,171, Dec. 13, 2010, Notice of Allowance.
U.S. Appl. No. 12/110032, Dec. 20, 2010, Notice of Allowance.
U.S. Appl. No. 12/492,178, Feb. 25, 2011, Office Action.
U.S. Appl. No. 11/321,551, Mar. 17, 2011, Notice of Allowance.
U.S. Appl. No. 10/813,855, May 6, 2011, Office Action.
U.S. Appl. No. 12/492,178, May 26, 2011, Office Action.
U.S. Appl. No. 11/321,551, Jul. 11, 2011, Notice of Allowance.
U.S. Appl. No. 10/813,855, Nov. 9, 2011, Office Action.
U.S. Appl. No. 12/492,178, Jan. 6, 2012, Notice of Allowance.
U.S. Appl. No. 11/620,591, Mar. 19, 2009, Office Action.
U.S. Appl. No. 11/620,591, Sep. 18, 2009, Notice of Allowance.

* cited by examiner

| Phase | Illuminate | Read From Even Sensors | Read From Odd Sensors |
|---|---|---|---|
| Phase #1 | Illuminators #1 | Right Half | Left Half |
| Phase #3 | None | Left Half | Right Half |
| Phase #2 | Illuminators #2 | Left Half | Right Half |
| Phase #4 | None | Right Half | Left Half |

ALTERNATING LIGHT SOURCES TO REDUCE SPECULAR REFLECTION

BACKGROUND

The functionality of many computing systems and other devices relies on effective display of information using a display. More recently, the display has also been used in an interactive manner as a direct input device. For instance, a display might be equipped with touch sense resistive and/or capacitive arrays to detect a portion of the display being contacted.

Some prior interactive displays use "vision capture" technology in which a camera is positioned behind the display, the display consisting of one or more layers of transparent or semitransparent material. An infrared illuminator is also positioned behind the display to illuminate an object in front of or in contact with the display. Illumination light (i.e., light originating from the illuminator) reflected from the object is received back into the camera, which takes a picture of the reflected light. The picture is taken as electronic input to the system. Since the placement of the object in front of the display influences its image taken by the camera, the object may be used to input information into the system.

Some of the illumination light is reflected not off the object, but off of the relatively flat surfaces of the transparent or semi-transparent layer(s) forming the display. The result is that the camera will receive a specular reflection of relatively strong intensity at a specific area of the display. The specular reflection may be so strong that it would be difficult to distinguish any image actually reflected from an input object within the area of the specular reflection. The specular reflection may even saturate the camera in that specific area. The effect is somewhat analogous to the situation in which a person looks downward at a shallow pond on a sunny day. The person might be able to view the bottom of the pond except for the area that is at or close to the sun's blinding reflection.

Accordingly, specular reflections can adversely impact the ability to use an interactive display as input, especially if the input object is positioned at an area in which the camera is experiencing a specular reflection.

BRIEF SUMMARY

Although not required, embodiments of the present invention relate to an interactive display in which alternating illuminators are used to reduce or cancel specular reflections. The interactive display includes multiple illuminators and at least one camera placed behind one or more display layers. The interactive display uses a phase management mechanism that controls illumination phases of the interactive display. During the first phase, the first illuminator is controlled to dominate over the second illuminator. For example, the first illuminator may be turned on and the second illuminator may be turned off. In that state, the camera is caused to take an image. During the second phase, the second illuminator is controlled to dominate over the first illuminator.

A consolidated image is then formulated using a combination of the first and second images. The consolidated image may be formed such that specular reflections from the first image are deemphasized or even cancelled using portions of the second image, or vice versa. If the light sources are positioned such that their specular reflections are not overlapping, then the specular reflections effect may be mitigated or even eliminated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The appended drawings are used in order to more particularly describe embodiments of the present invention. Understanding that these drawings depict only typical embodiments of the invention and are not therefore to be considered to be limiting of its scope, the embodiments will be described and explained with additional specificity and detail through the use of the accompanying drawings in which.

DETAILED DESCRIPTION

Figure 8:
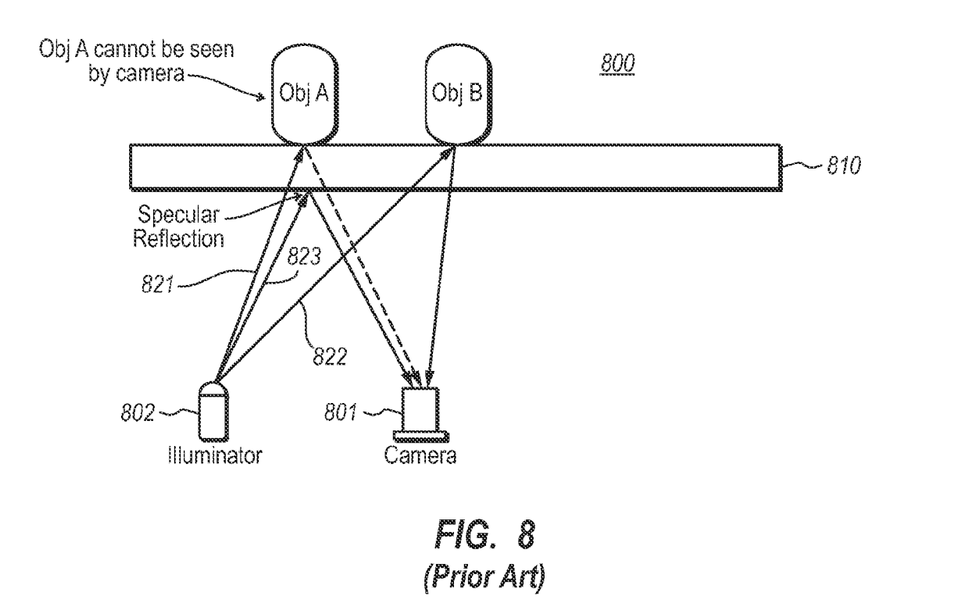
FIG. 8 illustrates an interactive display that includes only a single illuminator and a single camera behind the display layers.

Embodiments of the present invention extend to an interactive display that reduces specular reflections by alternating illumination phases. FIG. 8 illustrates some problems with using an interactive display 800 that only has a single illuminator 802 positioned behind the one or more display layers 810. The interactive display 800 is configured to receive input by placement of an object on the one or more transparent or semi-transparent layers 810 from which displayed light is emitted. Separate and apart from the display mechanism, which is largely not shown in FIG. 8, the interactive display 800 includes an imaging mechanism. Specifically, the illuminator 802 emits light, which is typically not of the same spectrum as the light being displayed so as not to interfere with the display operation.

The illuminator 802 emits light in many directions. Some of the light is emitted from the display, but does not interfere with the display operation since it is of a different frequency spectrum than the displayed image. Other light reflects from objects placed on the front surface (i.e., on or over the upper surface in FIG. 8) of the display layers 810, and thus the reflected light represents information about objects in front of the display. Other light reflects from the flat surfaces of the display layers 810, and thus does not represent information about objects in front of the display, but is simply spectral reflection.

For example, to illustrate the interference of spectral reflection, three rays of light 821, 822 and 823 are illustrated as being emitted from the illuminator 802. Rays 821 and 822 are reflected from objects in front of the display 810, and thus represent valid input information. Ray 823, on the other hand, reflects off of a flat surface of the display layers 810, and thus represents spectral reflection. Spectral reflection can thus be observed by the camera 801 at approximately the region of object A. Accordingly, object A may not be observable or may be difficult to observe by the camera 801. Object B, on the other hand, is not close to the area of spectral reflection, and thus may be observed without concern for spectral reflection. The interactive display 800 may thus not work properly if the input object is placed on certain regions of the display corresponding to spectral reflection.

Figure 1:
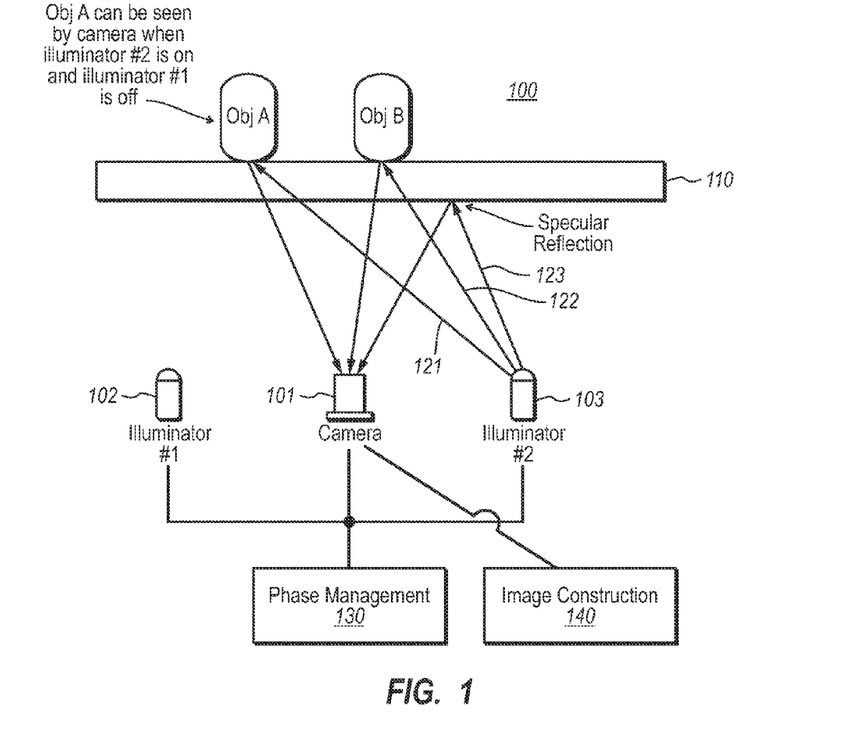
FIG. 1 illustrates a side-view of an interactive display in accordance with the principles of the present invention, the components of the interactive display not necessarily being drawn to scale.

FIG. 1 illustrates an interactive display 100 in accordance with one embodiment of the present invention. Although there may be more illuminators and cameras than are shown, the interactive display 100 is illustrated as including two illuminators 102 and 103 and one camera 101, each positioned behind the transparent or semi-transparent display layer(s) 110 (hereinafter simply referred to as "display layer 110"). The camera 101 and illuminator 102 are positioned similarly with respect to the display layer 110 as the camera 801 and illuminator 802 are with respect to the display layer(s) 810 (compare FIGS. 1 and 8). Accordingly, although not shown in FIG. 1, the interactive display will have specular reflections that interfere with the camera's 101 detection of object A when the illuminator 102 is on.

Similarly, when the second illuminator 103 is on and the first illuminator 102 is off, a specular reflection will be experienced, but in a different region of the image perceived from the camera 101. After all, the illuminators 102 and 103 are positioned at different positions behind the display layer 10. While illuminator 103 emits many rays of light, only three rays of light 121, 122 and 123 are shown. Ray 121 reflects off of object A and is received into the camera 101. Ray 122 reflects off of object B and is received into the camera 101. Ray 123 reflects off of the display layer 10, thereby representing specular reflection, and is received into camera 101. With illuminator 103 being on and illuminator 102 being off, objects A and B can both be perceived by the camera 101, since they are both further away from the area of specular reflection that is caused by the illuminator 103. Nevertheless, if there were an object closer to the area of specular reflection, that object might be much more difficult for the camera 101 to perceive while the illuminator 103 is on.

Figure 3A:
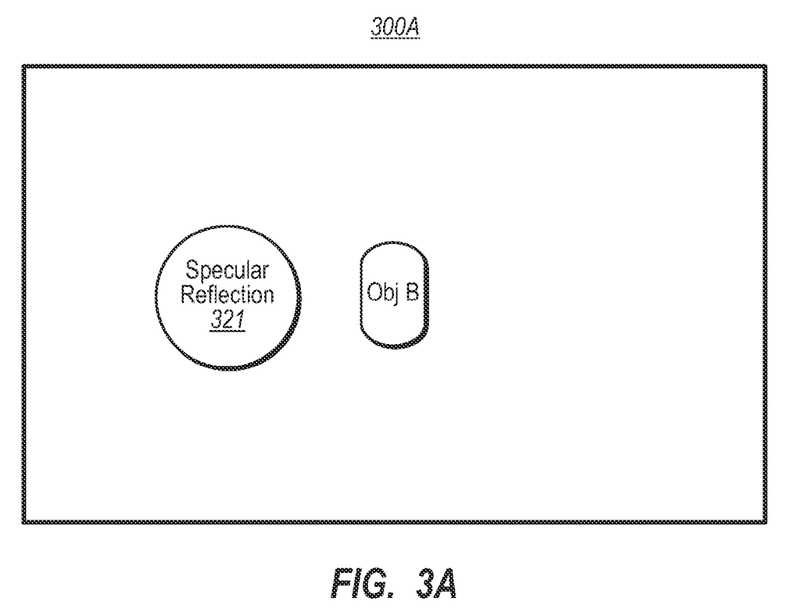
FIG. 3A illustrates an image of a specular reflection as it might be captured by the camera during a first illumination phase.
Figure 3B:
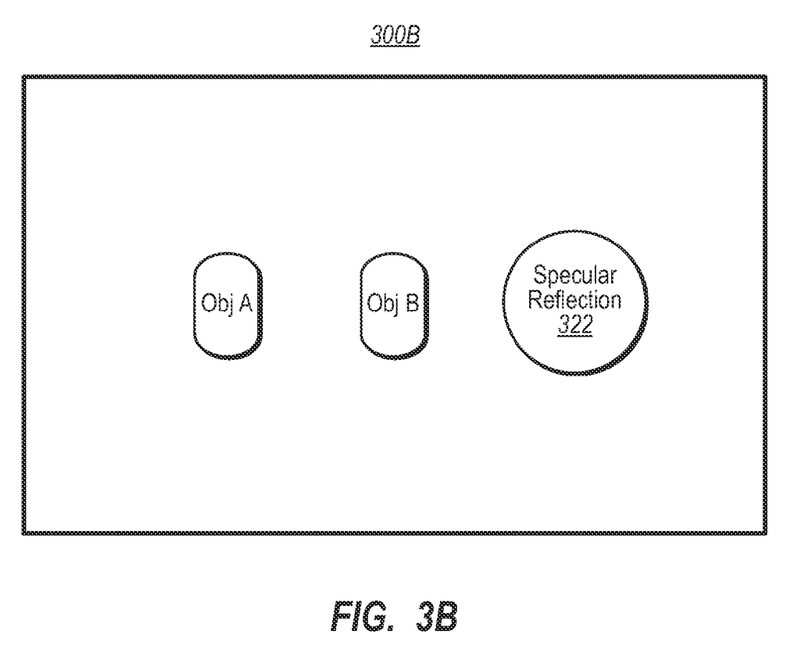
FIG. 3B illustrates an image of a specular reflection as it might be captured by the camera during a second illumination phase.

FIG. 3A illustrates a representation of an image 300A as it might be captured by the camera 101 when the first illuminator 102 is on, and the second illuminator 103 is off As previously discussed, the image 300A has an area of specular reflection 321 that obscures the ability to perceive objects with the area of specular reflections 321 such as, for example, object A. On the other hand, objects that are outside of the area of specular reflection 321, such as object B, may be more easily observed within the image 300A. FIG. 3B illustrates an image 300B as it might be capture by the camera 101 when the first illuminator 102 is off, and the second illuminator 103 is on. The image 300B also has an area of specular reflection 322 that obscures the ability to perceive objects within the area of specular reflection 322. On the other hand, objects that are outside of the area of specular reflection 322, such as objects A and B, may be more easily observed.

Figure 2:
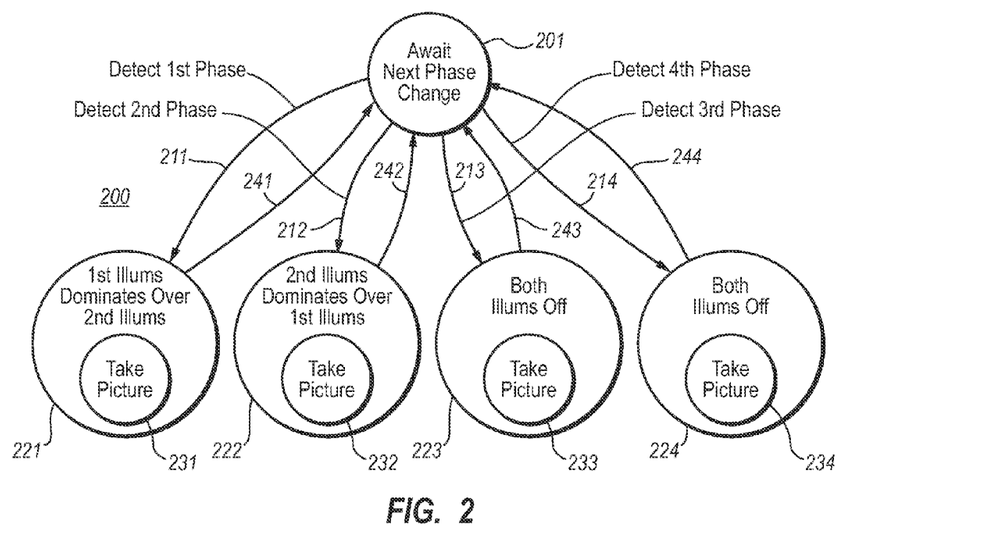
FIG. 2 illustrates a state transition diagram for a phase management mechanism to control illumination phases in an interactive display that includes at least two, but potentially more, illumination phases.

Returning to FIG. 1, the interactive display 100 also includes a phase management mechanism 130 that manages the illumination phases of the interactive display 100. FIG. 2 illustrates a state diagram 200 showing an example operation of the phase management mechanism 130. In state 201, the mechanism 130 awaits the next phase change of the interactive display (state 201), and in fact, controls the next phase change when the timing is appropriate. Upon transitioning to the first phase (state transition arrow 211), the first illuminator 102 is controlled to dominate over the second illuminator 103 (state 221).

This description will now set forth several definitions before returning to the main description of the state diagram 200 of FIG. 2. In this description and in the claims, one illuminator may be controlled to "dominate over" another illuminator if the dominating illuminator is caused to emit more light that the non-dominating illuminator. In one example of the behavior, the dominating illuminator may be simply "turned on", while the non-dominating illuminator is "turned off".

In this description and in the claims, an illuminator being "turned off" does not necessarily mean that light is not emitting from the turned off illuminator or that power is not being supplied to the turned off illuminator. Some illumination devices have a much faster turn on time if they are kept in an "off" state in which they have some power provided to the illuminator. Accordingly, in fast sampling interactive displays, the illuminator may be considered turned off, if it is still emitting light or being provided power, albeit to a perhaps much lesser extent than when in an "on" state. That said, illuminators may presently be powered-down and powered-up very quickly. Accordingly, in a very feasible embodiment, the dominating illuminator may be turned on, while the non-dominating illuminator may be turned off without any power at all.

Returning now to the state transition diagram 200 of FIG. 2, when the first illuminator is controlled to dominate over the second illuminator (state 221), the camera is caused to take the first image (act 231 within state 221). For example, the image 300A of FIG. 3A might be taken. Under the direction of the phase management mechanism 130, the state transition diagram then transitions (state transition arrow 241) to the state in which the next phase change is awaited (state 201).

At the appropriate time, the phase management mechanism 130 transitions to the second phase (state transition arrow 212). In that state, the second illuminator is controlled to dominate over the first illuminator (state 222). The camera is then caused to take the second image (act 232 within state 222). For example, the image 300B of FIG. 3B might be taken. Under the direction of the phase management mechanism 130, the state transition diagram then transitions (state transition arrow 242) to the state in which the next phase change is awaited (state 201).

Figure 4A:
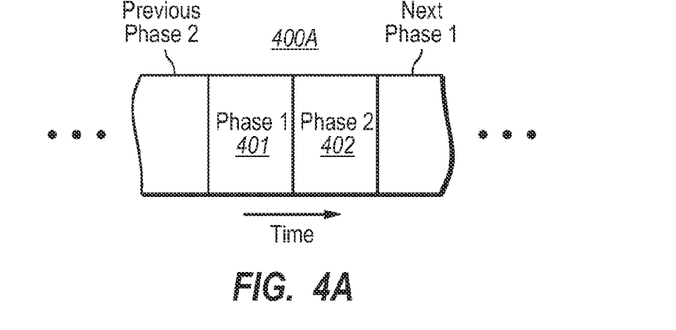
FIG. 4A illustrates an example time sequence of a two phase illumination sequence.

Although the state transition diagram 200 illustrates a third and fourth state as well, the interactive display 100 may be limited to two phases, the first phase and the second phase, which may be repeated. FIG. 4A shows a timing sequence diagram 400A in which the first phase 401 and the second phase 402 may be repeated.

Returning to FIG. 1, the interactive display 100 also includes an image construction mechanism 140 that is configured to construct an input image using at least a portion of the first image and at least a portion of the second image. In FIG. 1, the image construction mechanism 140 is illustrated as having access to camera 101 to thereby access the images. The image construction mechanism 140 may be hardware, software, or a combination thereof, and may be incorporate wholly or partially within the camera 101, or may be completely external to the camera 101.

The image construction mechanism 140 may construct the image in a variety of possible ways. In one example, the image construction mechanism 140 formulates the right half of the image using the right half of image 300A, which lacks the specular reflection. In that example, the left half of the image is formulated using the left half of the image 300B, which lacks a specular reflection. Accordingly, an entire image may be formulated without specular reflection once every two phases. Although the left half and right half of the final image may represent the image at slightly different times, this time might be minimized by increasing the sampling rate using a higher camera sampling rate and illuminator transition speed. Alternatively, the motion in front of the screen could be kept slower so as to prevent the central boundary in the final image from being too discontinuous. As another alternative, the user interface may be designed such that input is kept away from the central boundary at which the left and right halves of the image connect.

In another embodiment, rather than using the left half and the right half of the various images 300A and 300B, all of one image might be used except for the area of the spectral reflection. For example, image 300A might be used in its entirety except for the area of the spectral reflection 321. The area of the spectral reflection might then be populated using the corresponding area of the other image 300B. It is notable that the area within image 300B that corresponds to the spectral reflection 321 of image 300A lacks spectral reflection, and is entirely outside of the spectral reflection 322 of image 300B. Accordingly, the final image lacks any spectral reflection.

The boundary for what is included within the final image may be chosen differently so long as portions of each image are used. Significant benefit may be derived using the principles of the present invention if the areas that are included within any given position of the final position are chosen from the corresponding image that lacks spectral reflection at that position. However, after having read this description, there may be those who attempt to use the principles of the present invention to reduce, rather than eliminate, spectral reflections.

Such motivations may be due to technical limitations such as, for example, perhaps the spectral reflection from one of the images overlaps to some extent the spectral reflection of the other image. Thus, unless there are additional illumination phases and illuminators, elimination of the spectral image will not be feasible in the overlapping area of spectral reflection.

Motivations may also be for pragmatic reasons, such as attempts to design around the principles of the present invention in the mistaken belief that the principles of the present invention apply only if the spectral reflection is completely eliminated in the final image. Those of ordinary skill in the art will recognize, after having read this description, that significant benefit may be derived using the principles of the present invention, even if some areas of spectral reflection are chosen to be in the final image, so long as the spectral reflection is reduced in the final image as compared to at least one of the input images.

There may be more than two illumination phases. For example, if spectral reflections from the first two illuminators are overlapping somewhat, it may be helpful to have a third phase is which a third illuminator is turned on, while the first and second illuminators are turned off In the first and/or second phases, this third illuminator may be turned off Accordingly, it is more likely that portions of all three images may be selected so as to create an image that has significantly reduced or eliminated spectral reflections. Using these same principles, fourth or even more illumination phases may prove helpful to reduce spectral reflection given the principles of the present invention.

Illumination phases are helpful not just in cancelling specular reflection, but also in cancelling ambient light using the principles of the present invention. For instance, suppose that the illuminators are operating using infrared light. In many environments, there may be considerable amounts of ambient infrared light. For instance, the sun emits considerable amounts of infrared light. Such ambient light might also adversely impact the ability of the camera to detect the input object as distinguished from ambient light.

Referring to the state diagram 200 of FIG. 2, the first two phases are used to reduce or cancel spectral reflection, whereas the third and fourth phases are used to reduce or cancel ambient light. When the third phase is entered (as represented by state transition arrow 213) under the control of the phase management mechanism 130, both illuminators are turned off (state 223). The camera then takes a third image (act 233 within state 223), after which the next phase change is again awaited as represented by transition arrow 243. In this third state, there is no or little internally generated illumination received from the camera. Instead, a much higher proportion is externally generated ambient light. This third image may be subtracted from the combination of the first and second images in order to construct a final image that has reduced or eliminated spectral reflections and ambient light. This might further increase the sensitivity of the interactive display to input objects placed on or in front of the display.

If three phases are used, the image construction mechanism might calculate the image using the following Equation (1):

$$\text{FinalImage} = (\text{phase \#1 right half image} + \text{phase \#2 left half image}) - \text{phase \#3 image} \tag{1}$$

Figure 4B:
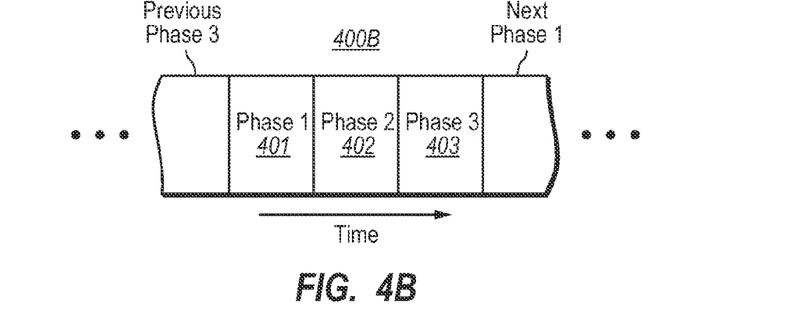
FIG. 4B illustrates an example time sequence of a three phase illumination sequence.

Although four phases are shown in the state diagram 200 of FIG. 2, there may once again be the first two phases to reduce or cancel the specular reflections, and just a single third phase used to cancel ambient light. The timing sequence diagram 400B of FIG. 4B shows the phase diagram sequence in which the first two phases 401 and 402 are used to reduce or eliminate specular reflection, and the third phase 403 is used to reduce or eliminate ambient light. Once again, this phase sequence may repeat as shown in FIG. 4B.

In order to simplify the operation of reducing or cancelling ambient light, a fourth phase may be used. Referring back to the state diagram 200 of FIG. 2, if the fourth phase is entered (state transition arrow 214) under the control of the phase management mechanism 140, both illuminators are turned (or kept) off (state 224). In that state, another image is taken by the camera (act 234 within state 224), and the next phase is then awaited (as represented by transition arrow 244 leading back to state 201).

Figure 4C:
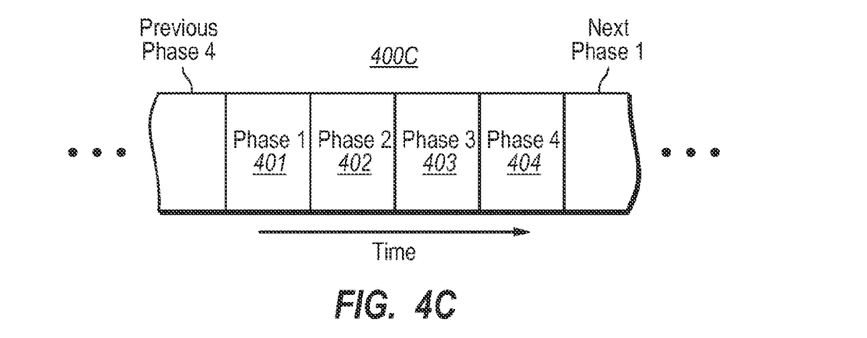
FIG. 4C illustrates an example time sequence of a four phase illumination sequence.
Figure 4D:
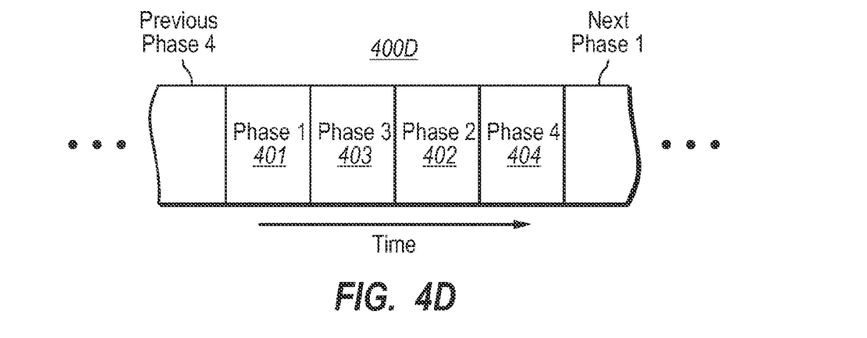
FIG. 4D illustrates an example time sequence of another four phase illumination sequence.

As represented by the timing diagram 400C of FIG. 4C, the two specular reduction illumination phases 401 and 402 may be adjacent in time, whereas the two ambient light reduction illumination phases 403 and 404 may also be adjacent in time. However, as represented by the timing diagram 400D of FIG. 4D, the specular reduction illumination phases 401 and 402 may be interleaved with the ambient light reduction illumination phases 403 and 404. This latter phase sequence of FIG. 4D may be preferred over the phase sequence of FIG. 4C, since interleaving specular reduction illumination phases and ambient light reduction phases may result in smoother image sampling.

Regardless, if four phases are used, the image construction mechanism 140 may use all four images in the final image. For instance, the right half of the first image (e.g., image 300A of FIG. 3A) may be combined with the left half of the second image (e.g., image 300B of FIG. 3B). Before or after this combination, one of the left or right halves of the image captured during the third phase may then be subtracted from the corresponding half of the image. The other of the left or right halves of the image captured during the fourth phase may then be subtracted from the other corresponding half of the image. For example, the right half of the final image might be calculated using the following Equation (2):

FinalImage right half=(phase #1 right half)−(phase #3 right half) (2)

On the other hand, the left half of the final image might be calculated using the following Equation (3)

FinalImage left half=(phase #2 left half)−(phase #4 left half) (3)

Figure 5A:
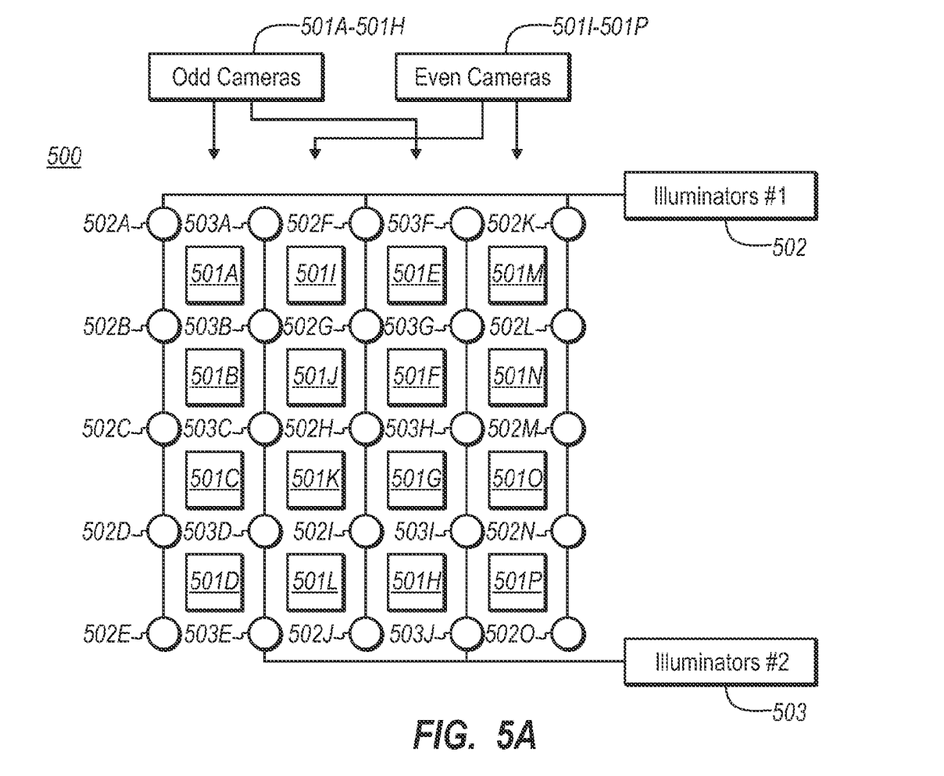
FIG. 5A illustrates a top view of an array of interleaved illuminators and cameras in accordance with a specific example embodiment of the present invention.

FIG. 5A illustrates that an array 500 of illuminators and cameras that may be used in accordance with one specific example of the principles of the present in invention. In this embodiment, the camera 101 of FIG. 1 may be thought of as an array 501 of cameras, the first illuminator 102 of FIG. 1 may be thought of as a first array 502 of illuminators, and the second illuminator 103 of FIG. 1 may be thought of as a second array 503 of illuminators.

During the first phase, all of the corresponding first array of illuminators 502 (including interconnected illuminators 502A though 502O) illuminate, whereas all of the corresponding second array of illuminators 503 (including interconnected illuminators 503A through 503J) are turned off During the second phase, all of the corresponding second array of illuminators 503 are turned on, whereas all of the corresponding first array of illuminators 502 are turned off The array of cameras 501 (including cameras 501A through 501P) all take images at approximately the same time since they are interconnected. Each camera is responsible for imaging its corresponding grid portion of the display.

The structure 500 of FIG. 5A may be used in the two or three illumination phase embodiment described above. However, the chart of FIG. 5B illustrates how the structure 500 of FIG. 5A might operate in an example four phase embodiment.

In the first phase, the illuminators 502 are on, and the illuminators 503 are off, the right half of each of the images for all of the even cameras 501I through 501P are read, whereas the left half of each of the images for all of the odd cameras 501A through 501H are read.

Figure 5B:
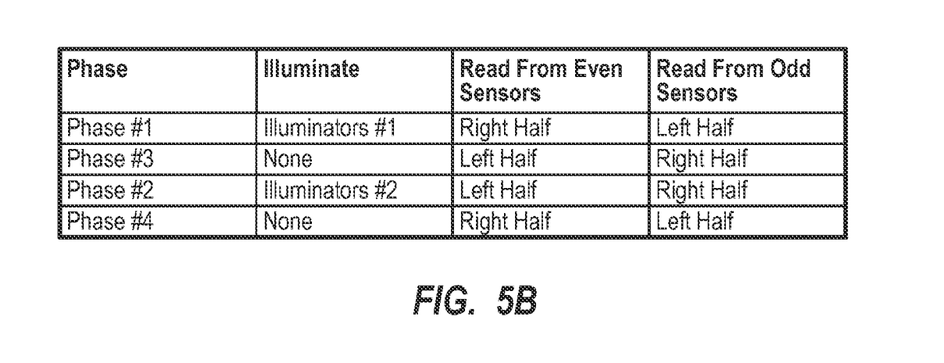
FIG. 5B illustrates an example four phase illumination sequence for use with the interleaved illuminators and cameras of FIG. 5A.

In the next phase, called "phase #3" in the FIG. 5B, all illuminators 502 and 503 are off, the left half of each of the images for all of the even cameras 501I through 501P are read, whereas the right half of each of the images for all of the odd cameras 501A through 501H are read.

In the next phase, called "phase #2" in the FIG. 5B, the illuminators 503 are on, and the illuminators 502 are off, the left half of each of the images for all of the even cameras 501I through 501P are read, whereas the right half of each of the images for all of the odd cameras 501A through 501H are read.

In the next phase, called "phase #4"), all illuminators are off, the right half of each of the images for all of the even cameras 501I through 501P are read, whereas the left half of each of the images for all of the odd cameras 501A through 501H are read.

For each grid area corresponding to a single camera in the array of cameras, the grid image may be obtained using Equations (2) and (3) presented above. The grid images may then be combined to form the entire image.

Figure 6:
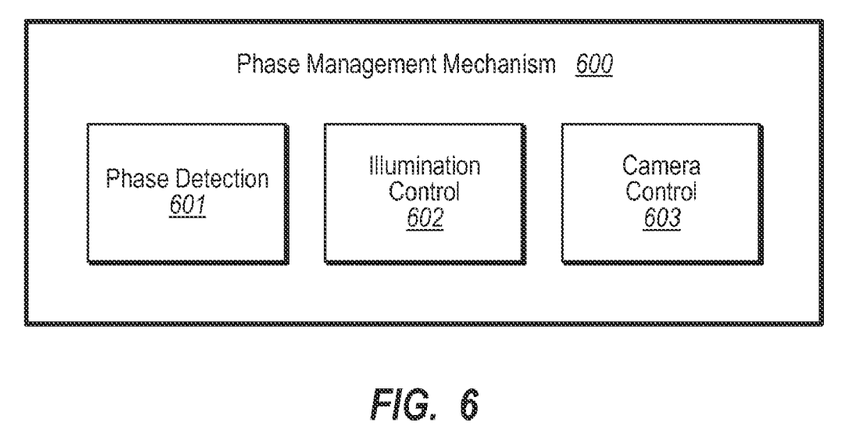
FIG. 6 schematically illustrates components of an illumination phase management mechanism in accordance with the principles of the present invention.

For completeness, FIG. 6 schematically illustrates an example structure 600 of the phase management mechanism 130 of FIG. 1. The example phase management mechanism 130 includes a phase detection mechanism 601 that is configured to detect a proper current phase of the interactive display (i.e., what the current phase should be given the present timing). Referring to FIG. 2, such detection may cause the state transitions represented by arrows 211 through 214.

The phase management mechanism 600 also includes an illumination control mechanism 602, which may control the illuminators to be in the appropriate state given the phase. For instance, illumination control mechanism 602 may cause the first illuminator to turn on and the second illuminator to turn off when in the first phase (state 221 of FIG. 2), the second illuminator to turn on and the first illuminator to turn off when in the second phase (state 222 of FIG. 2), and turn illuminators off when in the ambient light reduction phases (states 223 and 224 of FIG. 2).

The phase management mechanism 600 also includes a camera control mechanism 603 that is configured to cause the cameras to take the appropriate images during the appropriate illumination phases (corresponding to acts 231 through 234 of FIG. 2).

The phase management mechanism 600 may be external to the cameras and illuminators or may be partially or fully encompassed within one or more of the cameras and/or illuminators. The phase management mechanism 600 may be a centralized control module, or may be distributed across multiple modules.

Figure 7:
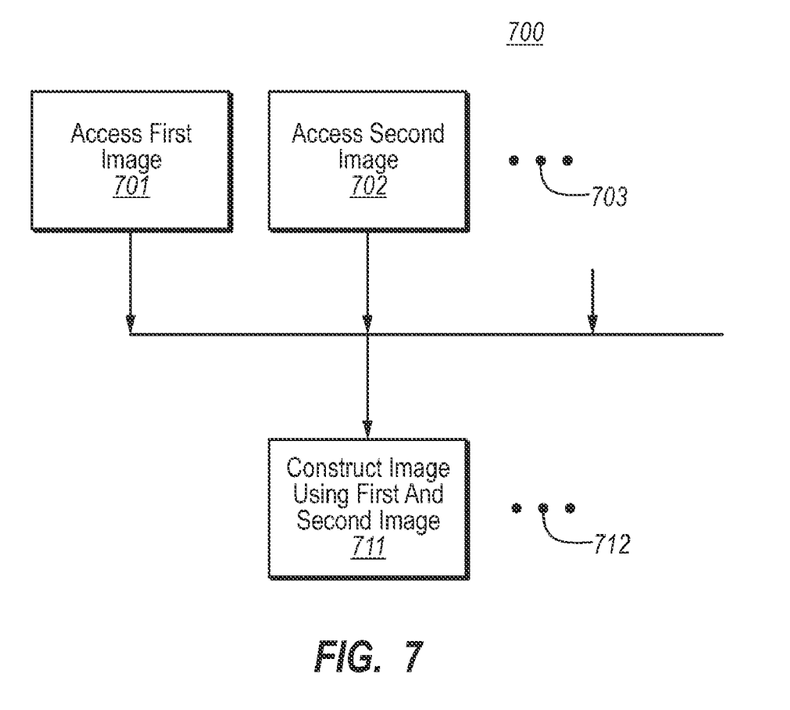
FIG. 7 illustrates a flowchart of a method for constructing an image in accordance with the principles of the present invention.

FIG. 7 illustrates a flowchart of a method 700 for operation of the image construction mechanism 140 of FIG. 1. The image construction mechanism accesses a first image taken by the camera when the interactive display is in a state in which the first illuminator is on and the second illuminator is off (act 701). The image construction mechanism also access a second image taken by the camera when the interactive display is in a state in which the second illuminator is on and the first illuminator is off (act 702). As represented by the horizontal ellipses 703, if there were more spectral reduction illumination phases or any ambient light reduction illumination phases, additional images may be accessed. The image construction mechanism then constructs the input image using a portion of the first image and a portion of the second image (act 711). If there were more images taken as represented by the horizontal ellipses 703, then those additional images might also be used to construct the image as represented by the horizontal ellipses 702.

Accordingly, the embodiments have been described in which an interactive display alternates illuminators to reduce or cancel specular reflections. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An interactive display comprising:
one or more display layers that are at least partially transparent, the one or more display layers having a first side and a second opposing side;
a first illuminator positioned at a first location behind the one or more display layers, such that at least some light emitted from the first illuminator passes from the first illuminator through the first side and the one or more display layers towards an object positioned on the second opposing side of the one or more display layers during illumination of the first illuminator;
a second illuminator positioned at a second location behind the one or more display layers, such that at least some light emitted from the second illuminator passes from the first illuminator through the first side and the one or more display layers towards the object positioned on the second opposing side of the one or more display layers during illumination of the second illuminator;
a camera positioned behind the one or more display layers with the first and second illuminators, the camera being configured to take images of at least a portion of the first side of the one or more display layers;
a phase management mechanism configured to:
control alternation of phases of the interactive display, the interactive display having a plurality of phases including at least a first phase, a second phase, and a third phase;
when in the first phase, controlling the first illuminator to dominate over the second illuminator, and in the first phase causing the camera to take a first image;
when in the second phase, controlling the second illuminator to dominate over the first illuminator, and in the second phase causing the camera to take a second image; and
when in the third phase, controlling all illuminators, including the first illuminator and the second illuminator, to be turned off, and in the third phase causing the camera to take a third image;
an image construction mechanism configured to construct an input image using at least at least a portion of the first image, at least a portion of the second image, and at least a portion of the third image.

2. The interactive display in accordance with claim 1, wherein the image construction mechanism is configured to construct the input image using a consolidation of the first and second images and a subtraction of at least a portion of the third image.

3. The interactive display in accordance with claim 1, wherein:
the interactive display includes at least four phases including the first phase, the second phase, the third phase, and a fourth phase,
the phase management mechanism is further to turn both the first and second illuminators off when in the fourth phase, and in fourth phase causing the camera to take a fourth image, and
the image construction mechanism is further configured to construct the input image using at least a portion of the fourth image.

4. The interactive display in accordance with claim 3, wherein the image construction mechanism is configured to construct the input image using a consolidation of the first and second images and a subtraction of at least a portion of the third image and a subtraction of at least a portion of the fourth image.

5. The interactive display in accordance with claim 3, wherein the first and second phases are adjacent in time.

6. The interactive display in accordance with claim 5, wherein the third and fourth phases are adjacent in time.

7. The interactive display in accordance with claim 3, wherein the first and second phases interleave the third and fourth phases.

8. The interactive display in accordance with claim 1, wherein the camera is a first camera, the interactive display further comprising:
a third illuminator positioned at a third location behind the one or more display layers;
a fourth illuminator positioned at a fourth location behind the one or more display layers; and
a second camera positioned behind the one or more display layers,
wherein the phase management mechanism is further configured to:
when in the first phase, controlling the third illuminator to dominate over the fourth illuminator, and in the first phase causing the second camera to take a third image; and
when in the second phase, controlling the fourth illuminator to dominate over the third illuminator, and in the second phase causing the second camera to take a fourth image, and
wherein the image construction mechanism is configured to construct a second input image using at least at least a portion of the third image and at least a portion of the fourth image.

9. The interactive display in accordance with claim 1, wherein the phase management mechanism is configured to control the first illuminator to dominate over the second illuminator by turning the first illuminator on and turning the second illuminator off.

10. The interactive display in accordance with claim 9, wherein the phase management mechanism is configured to control the second illuminator to dominate over the first illuminator by turning the second illuminator on and turning the first illuminator off.

11. The interactive display in accordance with claim 1, wherein the first and second illuminators are infrared illuminators and the camera is an infrared camera.

12. The interactive display in accordance with claim 1, wherein:
the first illuminator constitutes an array of a first plurality of illuminators, wherein when the first illuminator is turned on, each of the first plurality of illuminators are turned on, wherein the second illuminator constitutes an array of a second plurality of illuminators, wherein when the second illuminator is turned on, each of the second plurality of illuminators are turned on, and
the camera constitutes an array of a plurality of cameras, wherein when the camera takes an image, each of the plurality of cameras takes a portion of the image.

13. The interactive display in accordance with claim 12, wherein each of the plurality of cameras corresponding to one of the first plurality of illuminators and one of the second plurality of illuminators, such that a majority of illuminated light received by the corresponding camera originates from either the corresponding one of the first plurality of cameras or the corresponding one of the second plurality of cameras.

14. An interactive display that utilizes a plurality of alternating phases, including:

one or more display layers that are at least partially transparent and that comprise a first side upon which an object is positioned and a second opposing side;
a first and second illuminator and a camera which are all positioned behind the one or more display layers on the second opposing side of the one or more display layers; and
a phase management mechanism, which comprises:
  a phase detection mechanism configured to detect a current phase of the interactive display;
  an illumination control mechanism configured to:
    cause the first illuminator to generate more light than an amount of reduced light that is generated by the second illuminator when the phase detection mechanism detects the current phase should be a first phase, such that the first illuminator is caused to dominate over the second illuminator within the first phase, even though the second illuminator still emits the reduced light in the first phase;
    cause the second illuminator to generate more light than an amount of reduced light that is generated by the first illuminator when the phase detection mechanism detects the current phase should be a second phase, such that the second illuminator is caused to dominate over the first illuminator within the second phase, even though the first illuminator still emits the reduced light in the second phase; and
    cause all illuminators, including the first illuminator and the second illuminator, to generate no light when the phase detection mechanism detects the current phase should be a third phase; and
  a camera control mechanism configured to take a first picture of at least a portion of the one or more display layers when the phase detection mechanism detects the current phase should be the first phase, to take a second picture of the portion of the one or more display layers when the phase detection mechanism detects the current phase should be the second phase, and to take a third picture of the portion of the one or more display layers when the phase detection mechanism detects the current phase should be the third phase,
  wherein an image is constructed using at least a portion of the first picture, at least a portion of the second picture, and at least a portion of the third picture.

15. In an image construction mechanism for use in an interactive display that includes a plurality of alternating phases, one or more display layers that are at least partially transparent, a first and second illuminator and a camera positioned at different locations behind the one or more display layers, a method for constructing an image comprising:
  during a first phase, turning on a first illuminator which is positioned to illuminate a first side of one or more display layers of the interactive display so as to emit light from the first illuminator through the first side and the one or more display layers towards an object on a second and opposing side of the one or display layers during the first phase, and while refraining from turning on a second illuminator during the first phase, the second illuminator also being positioned to illuminate the first side of the one or more display layers;
  taking a first image by a camera of at least a portion of the first side of the one or more display layers during the first phase;
  during a second phase, turning on a second illuminator which is positioned to illuminate the first side of the one or more display layers of the interactive display so as to emit light from the second illuminator through the first side and the one or more display layers towards the object on the second and opposing side of the one or display layers during the second phase, and while refraining from turning on the first illuminator during the second phase;
  taking a second image by the camera of the portion of the first side of the one or more display layers during the second phase;
  during a third phase, turning off all illuminators, including the first illuminator and the second illuminator;
  taking a third image by the camera of the portion of the first side of the one or more display layers during the third phase; and
  an act of constructing an input image using a portion of the first image, a portion of the second image, and a portion of the third image.

16. The method in accordance with claim 15, wherein a portion of the first image that is not used in the constructed input image includes a specular reflection of the first image.

17. The method in accordance with claim 16, wherein a portion of the second image that is not used in the constructed input image includes a specular reflection of the second image.

18. The method in accordance with claim 15, wherein the third image includes the portion of the first side of the one or more display layers as illuminated by ambient lighting.

* * * * *